US010180769B1

(12) United States Patent
Olwal et al.

(10) Patent No.: US 10,180,769 B1
(45) Date of Patent: Jan. 15, 2019

(54) SYMBOL DISPLAY

(71) Applicant: Google Inc., Mountain View, CA (US)

(72) Inventors: Alex Olwal, Mountain View, CA (US); Bernard C. Kress, Redwood City, CA (US); Greg E. Priest-Dorman, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 31 days.

(21) Appl. No.: 15/096,865

(22) Filed: Apr. 12, 2016

(51) Int. Cl.
G06T 19/00 (2011.01)
G06F 3/0481 (2013.01)
G09G 3/22 (2006.01)
G02B 5/18 (2006.01)
G02B 27/01 (2006.01)
G02B 5/32 (2006.01)

(52) U.S. Cl.
CPC ....... *G06F 3/04817* (2013.01); *G02B 5/1842* (2013.01); *G02B 5/32* (2013.01); *G02B 27/0172* (2013.01); *G06T 19/006* (2013.01); *G09G 3/22* (2013.01); *G02B 2027/014* (2013.01); *G02B 2027/0141* (2013.01); *G02B 2027/0174* (2013.01)

(58) Field of Classification Search
None
See application file for complete search history.

(56) References Cited

U.S. PATENT DOCUMENTS

| 5,066,100 A * | 11/1991 | Ferrante | G02B 27/4244 359/566 |
| 8,773,599 B2 * | 7/2014 | Saeedi | G02B 5/30 349/11 |
| 2011/0213664 A1 * | 9/2011 | Osterhout | G02B 27/017 705/14.58 |
| 2012/0218481 A1 | 8/2012 | Popovich et al. | |
| 2013/0070338 A1 | 3/2013 | Gupta et al. | |
| 2013/0201094 A1 | 8/2013 | Travis et al. | |
| 2015/0160529 A1 | 6/2015 | Popovich et al. | |
| 2016/0033771 A1 * | 2/2016 | Tremblay | G02B 27/0172 345/8 |

FOREIGN PATENT DOCUMENTS

WO WO 2014/151877 A1 9/2014
WO WO 2014/155288 A2 10/2014

OTHER PUBLICATIONS

Zeiss, "Coherence of Light," http://zeiss-campus.magnet.fsu.edu/tutorials/coherence/indexflash.html, Mar. 2014.*

(Continued)

Primary Examiner — Nicholas R Wilson

(57) ABSTRACT

A method of in-eye icon projection using an electronic device includes emitting light with a light source in response to detecting an image condition. The light is then projected onto a diffraction grating, and the diffraction grating, when illuminated with the light, produces image light of a fixed icon. An image of the fixed icon is formed in an eye of a user, and the image of the fixed icon occupies only part of the user's field of view. The image light has a limited divergence such that the image of the fixed icon is only viewable in a single user's field of view.

20 Claims, 10 Drawing Sheets

(56) References Cited

OTHER PUBLICATIONS

Jiri Cech, "Holographic Optical Elements," Oct. 2004, http://jirkacech.com:80/public/Thesis/node13.html.*
Piao et al., "Full Color Holographic Optical Element Fabrication for Waveguide-type Head Mounted Display Using Photopolymer," Jun. 2013.*
Fun'iki Ambient Glasses, Japan Trends, accessed Apr. 11, 2016, 4 pages.
ION Glasses, Indiegogo, accessed Apr. 11, 2016, 11 pages.
Sportiiii, 4iiii Innovations, accessed Apr. 11, 2016, 5 pages.
The Device, Pivothead Wearable Imaging, accessed Apr. 11, 2016, 7 pages.

* cited by examiner

SYMBOL DISPLAY

TECHNICAL FIELD

This disclosure relates generally to displays and in particular but not exclusively, relates to projected symbol displays.

BACKGROUND INFORMATION

Electronic displays have become ubiquitous. They are used in many consumer devices that we interact with daily (e.g., laptop computers, smartphones, tablets, etc.). The demands of lower power consumption and greater screen resolution have encouraged the miniaturization and integration of these devices.

Electric displays have evolved from mechanical systems for displaying text and simple images, to electronic devices capable full color and 3D graphics. Seminal display technologies included motorized control of a flap to display text, including ball-game scores, stock quotes, etc. Cathode ray tubes replaced this technology and served as the industry standard for many decades.

Flat panel displays (LED, liquid crystal, etc.) represent the current state of the art. While these displays convey many advantages over the aforementioned display types, in certain use cases these technologies may not be ideal. For instances, in situations where power is extremely limited, modern solid state displays may still consume too much energy to be practical or effective.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus and method for displaying symbols in an eye are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
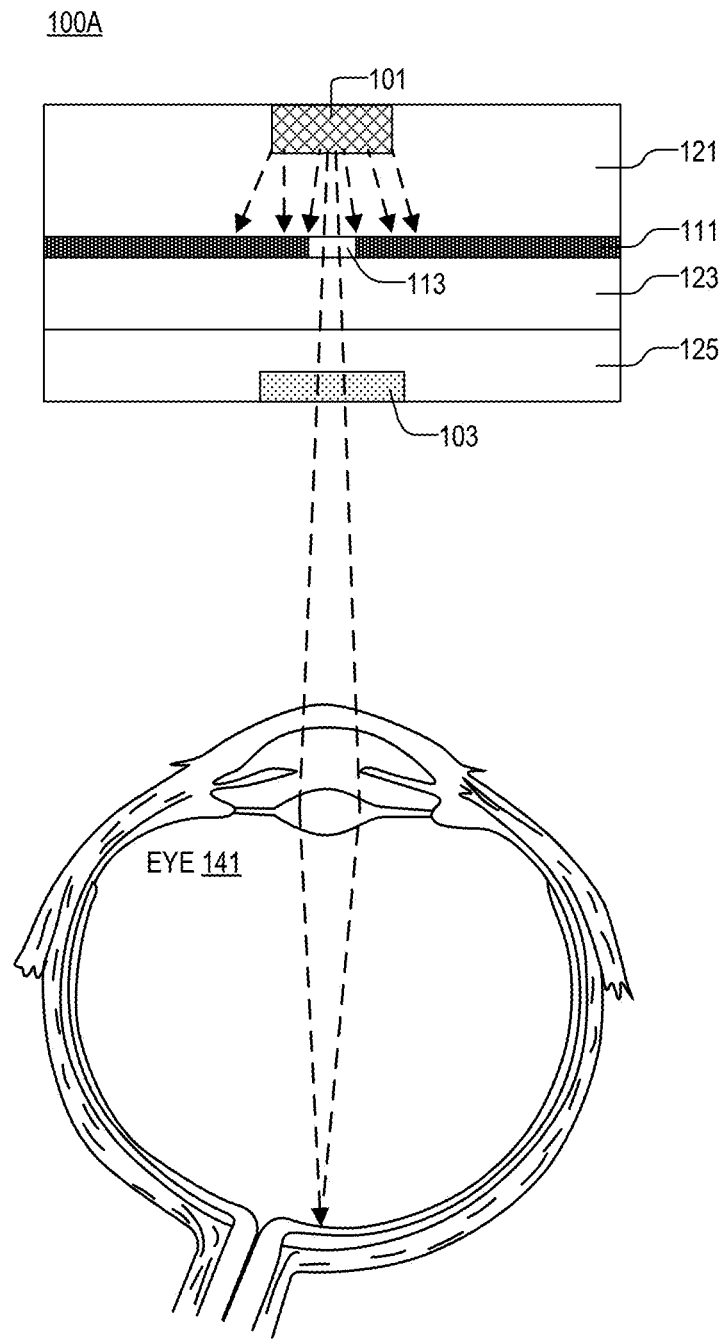
FIG. 1A is a cross sectional illustration of a transmissive display element, in accordance with an embodiment of the disclosure.

FIG. 1A is a cross sectional illustration of transmissive display element (TDE) 100A, in accordance with an embodiment of the disclosure. TDE 100A is designed to display a fixed icon to a user by shining light with a limited divergence through diffraction grating 103 and directly into eye 141 of the user.

TDE 100A includes: light source 101, diffraction grating 103, opaque layer 111, and aperture 113. In the depicted embodiment, light source 101 is contained in housing layer 121. Similarly, diffraction grating 103 and opaque layer 111 are contained in housing layer 125 and housing layer 123, respectively. In the depicted embodiment, light source 101 includes a light emitting diode, and opaque layer 111 is disposed between the light emitting diode and diffraction grating 103. Opaque layer 111 includes aperture 113, and aperture 113 is optically aligned with the light emitting diode to emit coherent light. Here, diffraction grating 103 is transmissive, and image light is directed through diffraction grating 103 and into eye 141 to form an image of a fixed icon in eye 141.

In one embodiment, diffraction grating 103 may include a planar grating or a 3D grating, meaning that the small shapes (slits) included in diffraction grating 103 may be disposed in a two dimensional plane or may be disposed in three dimensions to give the grating depth. In another or the same embodiment, diffraction grating 103 may include a holographic optical element (HOE), and the HOE is used to form the fixed icon. The HOE may be a computer generated hologram to produce complex shapes that form the fixed image icons. Additionally, diffraction grating 103 may be a swappable or replaceable part, allowing for images/icons/text to be changed, varied, and updated.

In the depicted embodiment, light is produced with light source 101. The light is sent through aperture 113 to limit the divergence of the light. The light is then sent through diffraction grating 103 and directly into eye 141. It is appreciated that it is not necessary for the image be reflected off of an external surface for eye 141 to see the image. For example, the image is not projected onto a screen for a user to see the image.

Figure 1B:
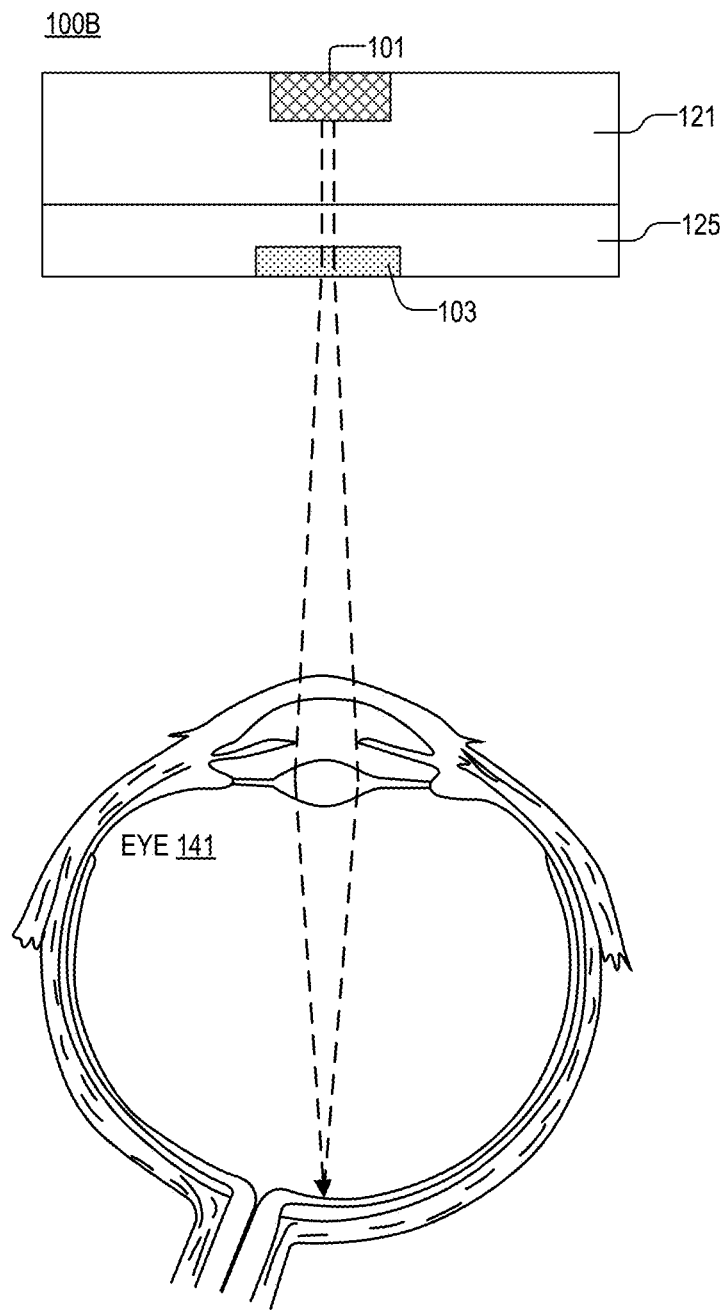
FIG. 1B is a cross sectional illustration of a transmissive display element, in accordance with an embodiment of the disclosure.

FIG. 1B is a cross sectional illustration of transmissive display element (TDE) 100B, in accordance with an embodiment of the disclosure. TDE 100B is similar in many respects to transmissive display element 100A. However, light source 101 in TDE 100B includes a laser diode. Thus, light leaving light source 101 is already substantially collimated and in phase. Accordingly, opaque layer 111, aperture 113, and housing layer 123 are not needed in this embodiment. However, housing layer 121 is still used to contain light source 101, and housing layer 125 is still used to contain diffraction grating 103.

In all embodiments, light source 101 may include other elements (not depicted in order to avoid obscuring certain aspects of the disclosure) which allow light source 101 to operate effectively. In one embodiment, light source 101 include may include a p-n junction and have electrodes disposed on the top and bottom surfaces. The electrodes and/or p-n junction may be transparent or partially transparent. Furthermore, light source 101, diffraction grating 103, and eye 141 have not been drawn to scale. Light source 101 may only be several microns in diameter. For instance the cross sectional area of light source 101 may only be 10 µm or less. In embodiments such as these, components of TDE 100B may be so small as to render them almost invisible to the human eye, or so small that when placed directly in the line of sight of eye 141, the user's vision of the outside world is minimally impaired (or not impaired at all).

Figure 1C:
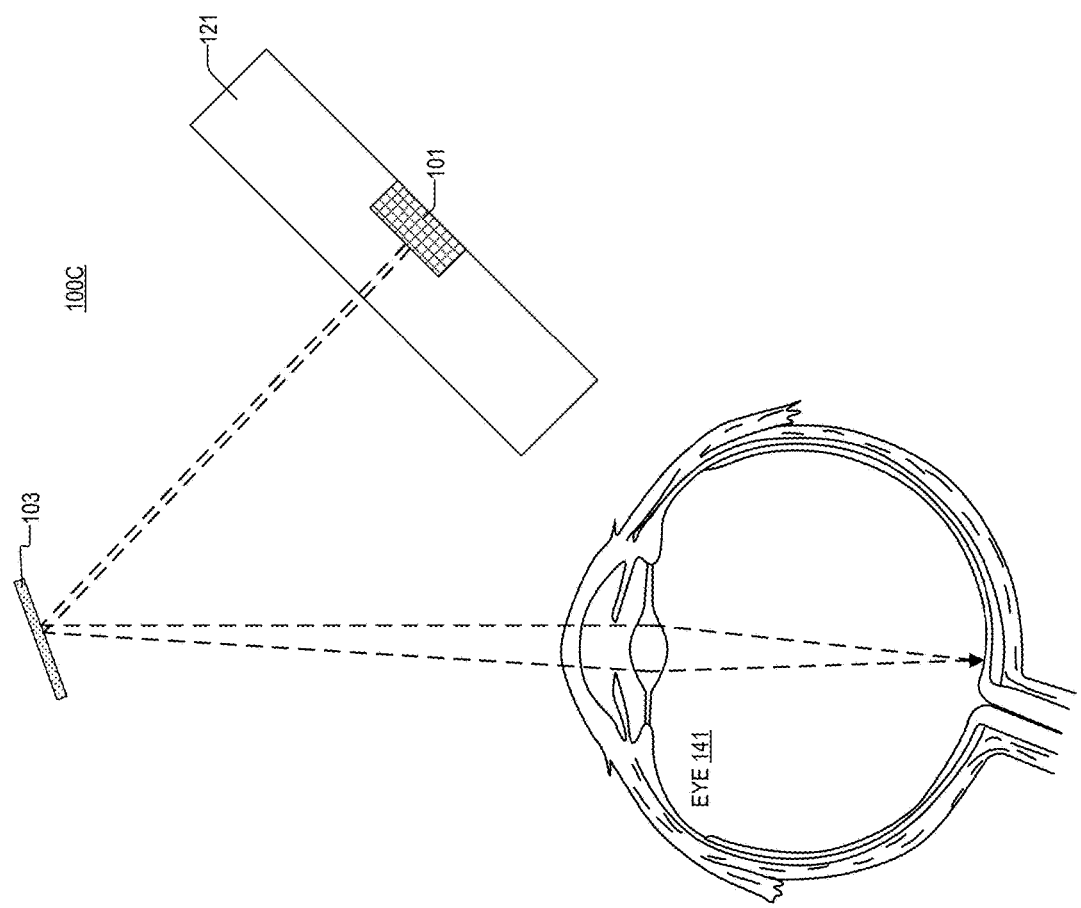
FIG. 1C is a cross sectional illustration of a reflective display element, in accordance with an embodiment of the disclosure.

FIG. 1C is a cross sectional illustration of reflective display element (RDE) 100C, in accordance with an embodiment of the disclosure. RDE 100C is similar in many respects to TDE's 100A and 100B with the exception that the diffraction grating in RDE 100C reflects light. In the depicted embodiment, light source 101 includes a laser diode and is included in housing layer 121. Diffraction grating 103 is reflective and positioned to reflect light into eye 141. Light is emitted by light source 101 and directed onto diffraction grating 103 to form image light. Image light is reflected off diffraction grating 103 and into eye 141. It is appreciated that the same result may be achieved with the diode/aperture configuration of FIG. 1A.

Figure 1D:
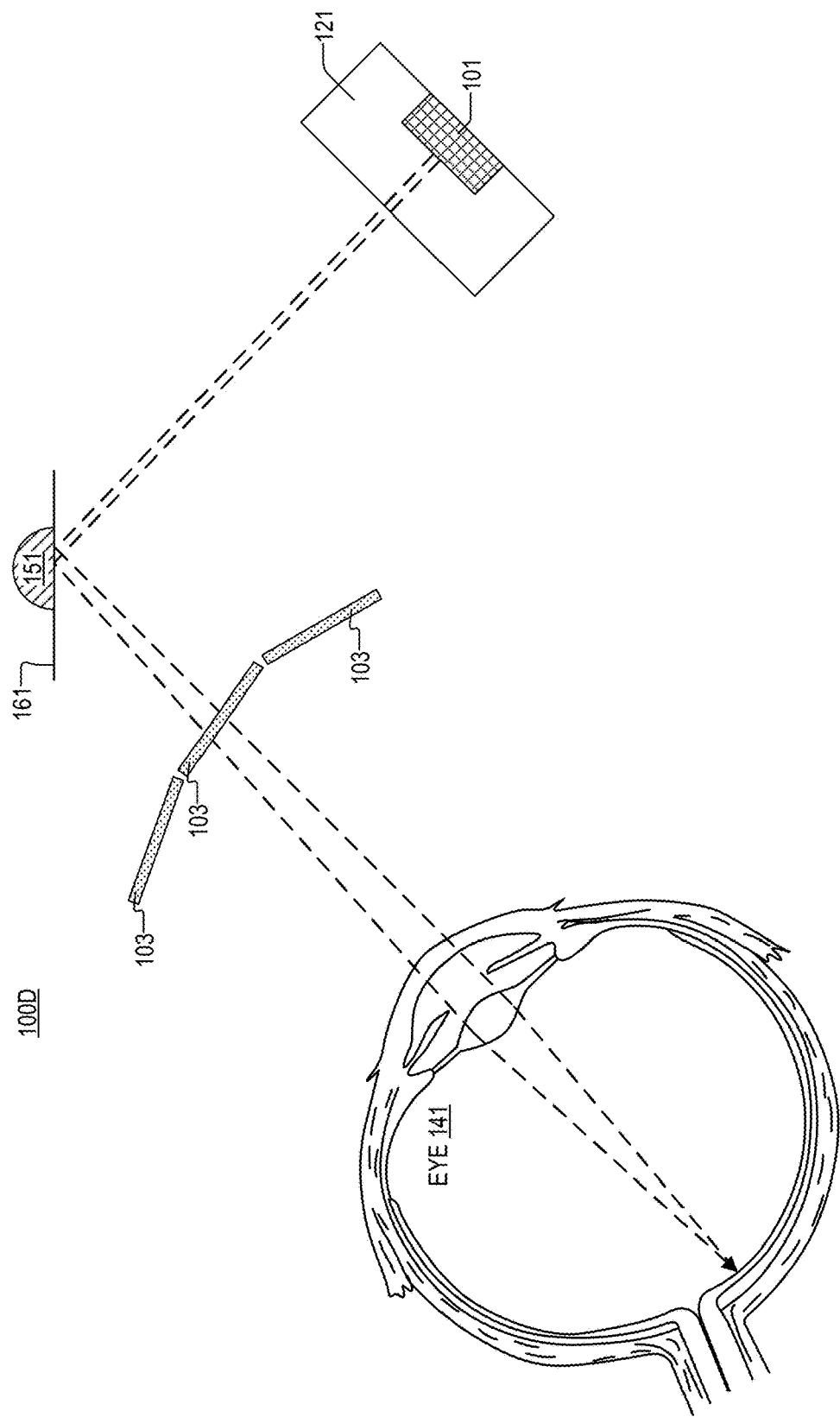
FIG. 1D is a cross sectional illustration of a transmissive display element, in accordance with an embodiment of the disclosure.

FIG. 1D is a cross sectional illustration of transmissive display element 100D, in accordance with an embodiment of the disclosure. However, unlike transmissive display elements 100A and 100B, light is reflected off mirror 161 and then sent through diffraction grating 103.

As depicted, light source 101 is a laser diode and included in housing layer 121. Light from the laser diode is directed onto a mirror 161. Light is reflected and sent through diffraction grating 103 and into eye 141. In the depicted embodiment, transmissive display element 100D includes multiple diffraction patterns 103 which may each contain a different fixed image. Mirror 161 is coupled to actuator 151 to change the orientation of mirror 161, and selectively send light through one of diffraction gratings 103. In one embodiment, actuator 151 is a piezoelectric actuator; however, in other embodiments, actuator 151 may be any electromechanical, or electromagnetic device capable of changing the orientation of mirror 161.

Figure 2:
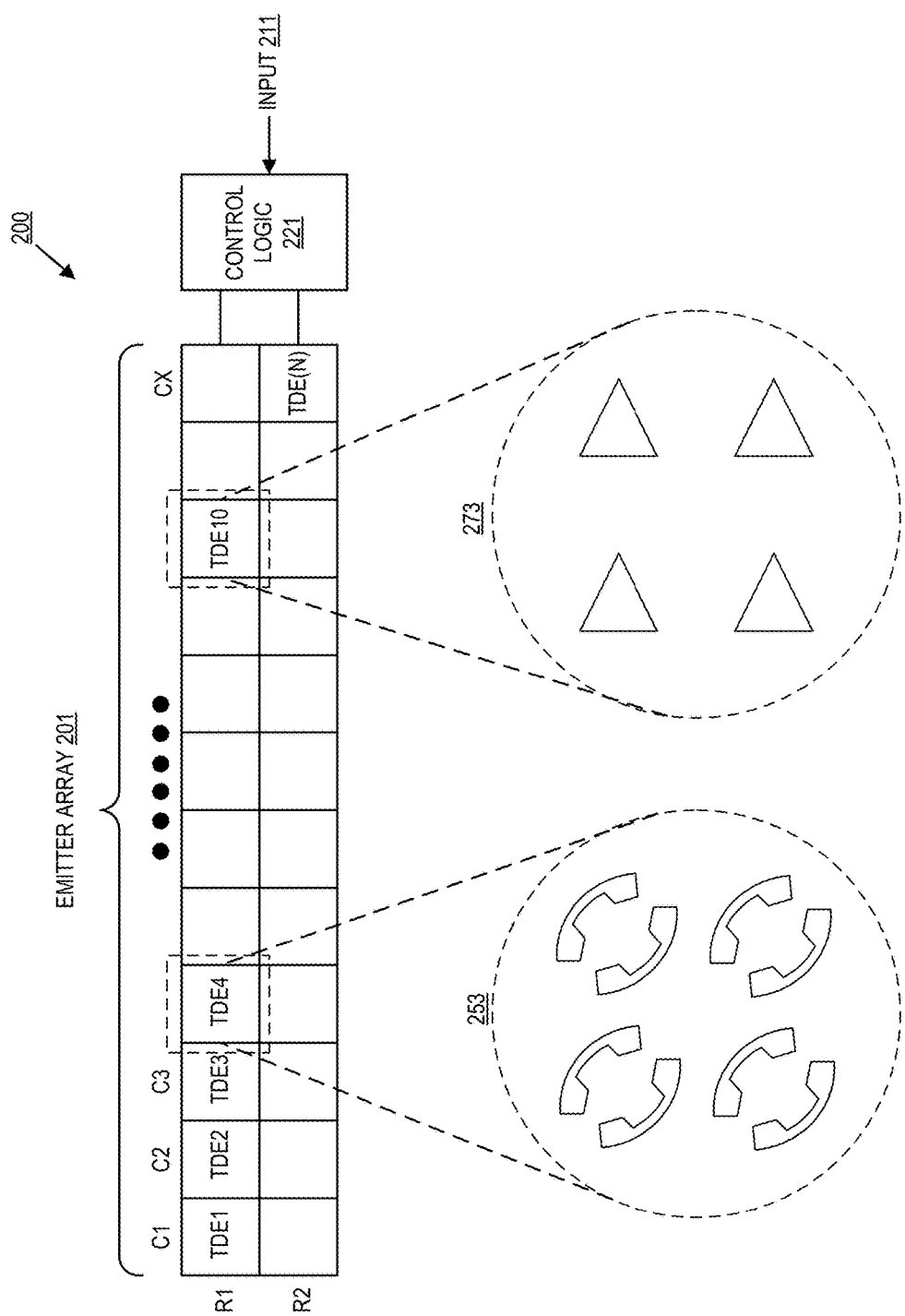
FIG. 2 is a functional block diagram illustrating a display system, in accordance with an embodiment of the disclosure.

FIG. 2 is a functional block diagram illustrating display system 200, in accordance with an embodiment of the disclosure. Display system 200 includes: emitter array 201, control logic 221, and input 211. In one embodiment, emitter array 201 is a two-dimensional array including a plurality of transmissive display elements (e.g., transmissive display elements 100A, 100B and 100D depicted in FIGS. 1A, 1B, and 1D) arranged into an array (e.g., TDE1, TDE2 . . . , TDE(N)). However, in another embodiment not depicted, emitter array 201 may include a plurality of reflective display elements (e.g., reflective display element 100C depicted in FIG. 1C).

As illustrated in FIGS. 1A-1D, TDEs and RDEs include a light source configured to emit coherent light (e.g., a light emitting diode, laser diode, or otherwise) and a diffraction grating. Here, a plurality of diffraction gratings are arranged into an array including rows and columns, and the diffraction gratings are optically aligned with the light source to produce image light of fixed icons in response to being illuminated by the coherent light emitted from the light source. In one embodiment, the light source includes a plurality of diodes, where each diode corresponds to an individual diffraction grating in a plurality of diffraction gratings. However, in another embodiment, the light source includes one diode (laser, LED, or otherwise), and the diode changes its orientation to selectively shine light on diffraction gratings to produce different images (see supra FIG. 1D). Control logic 221 (e.g., a controller and/or memory element) is coupled to display system 200. The control logic 221 includes logic instructions that, when executed by the control logic 221, will cause the display system 200 to perform operations such as: turning on the light source (e.g., light source 101) to project image light into an eye of a user of display system 200.

As illustrated, TDEs (or RDEs) are arranged into rows (e.g., rows R1-R2) and columns (e.g., columns C1-CX) to project image light and form an image in the eye of a user. However, it should be noted that the rows and columns do not necessarily have to be linear and may take other shapes depending on use case. The TDEs in emitter array 201 may be color and include red, green, and blue TDEs depending on the emission profile of the light source used and/or the presence of color filters. Additionally, TDEs may only produce images when illuminated with a particular wavelength of light. In other words, TDEs may only be sensitive to a particular optical wavelength (or range of wavelengths). Furthermore, different TDEs may be activated at different times and with different intensities such that the viewer sees one or more icons of different images.

In one embodiment, control logic 221 may include a processor or microcontroller. The processor or microcontroller may control individual TDEs in emitter array 201, or control groups of TDEs. As will be discussed later, display system 200 may be included in other more complex systems. Accordingly, control logic 221 may be coupled to an active display, and control logic 221 may further include logic instructions that, when executed by control logic 221, will cause the active display to display changing images to the user In the depicted embodiment, display system 200 includes input 211 to receive an image condition or the like. Input 211 may include user input via buttons, USB port, wireless receiver, optical sensors, etc. Input 211 may also include software installed on control logic 221 or data received from the internet or other source.

As shown, each TDE or RDE in display system 200 produces different fixed icon images. In the depicted embodiment, each diffraction grating generates a plurality of offset instances of a fixed icon to create a larger eyebox in which the user's eye can see the fixed icon image. This allows for the location of the user's eye to shift slightly and still see the fixed icon image. For example, TDE4 (when illuminated) shows four fixed icon images of phones 253; however, the user's eye should only see one image of phone 253, because each phone 253 is best viewable from a slightly different location. Similarly, TDE10 (when illuminated) shows four fixed icon images of "play" buttons 273 but the user's eye should only see one "play" button 273. In other embodiments, TDEs/RDEs may display any number/type of fixed images (see infra FIG. 7).

Figure 3A:
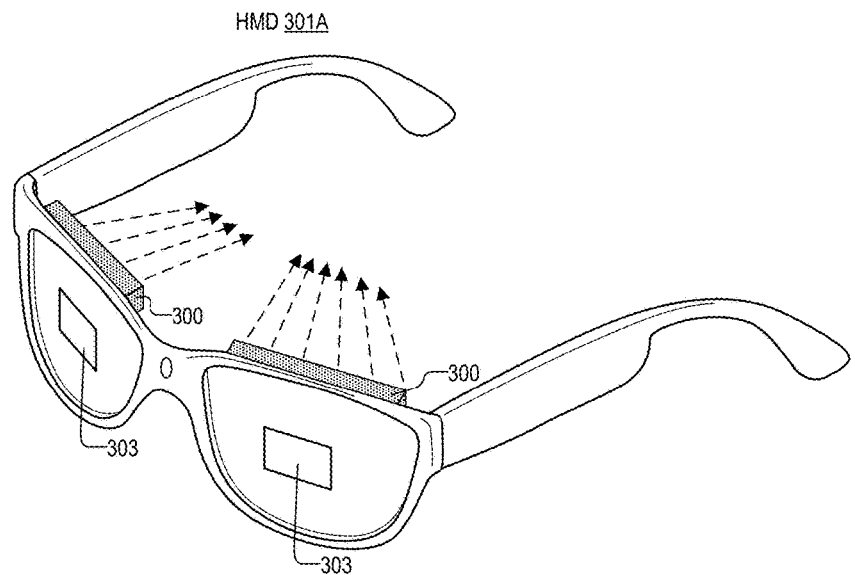
FIGS. 3A-3B are illustrations of a head mounted display including the display system of FIG. 2, in accordance with an embodiment of the disclosure.

FIG. 3A is an illustration of head mounted display (HMD) 301A including the display system of FIG. 2, in accordance with an embodiment of the disclosure. In the depicted embodiment, HMD 301A is a pair of glasses with display system 300 (e.g., display system 200 of FIG. 2) mounted onto the frames of the glasses. HMD 301A also includes an active display 303 disposed in the lenses of the glasses. In one embodiment, active display 303 may be transparent (or substantially transparent) such that the user's view of the outside world is clear and substantially unobstructed.

As previously stated, in display system 300 a light source is configured to emit coherent light, and a static diffraction grating is optically aligned with the light source. Here, a controller is communicatively coupled to HMD 301A, and the controller includes logic instructions that, when executed by the controller, will cause HMD 301A to perform operations comprising: (1) detecting an image condition; and (2) turning on the light source, in response to the image condition. This causes the light source to project light onto the diffraction grating. The diffraction grating produces image light of a fixed icon, and the image light of the fixed icon is directed into an eye of a user where the image light produces an image of the fixed icon in the eye of the user. It is worth noting that, the image light has a limited divergence such that the image of the fixed icon is only viewable in the user's eyebox. As illustrated, image light from display system 300 is directed to the user's eyes.

Image conditions may be events that are unique to the head mounted display and devices coupled thereto. For instance, in one embodiment HMD 301A includes a cellular phone. In this embodiment, an image condition may include receiving a phone call. When HMD 301A receives the phone call, the controller in HMD 301A may turn on the light source to project an image of a phone (or the like) into the user's eye to alert that user that they are receiving an incoming phone call. Similarly, HMD 301A may include a battery pack and—in the event of a low-battery condition—display system 300 may project an image of a low-power battery into the eye of the user to alert the user of the low battery condition. Since HMD 301A may be a relatively complex system with many microelectronic devices installed in it (e.g., microphone, phone, active display 303, battery pack, buttons, image sensors, etc.) the image condition may be one of a plurality of image conditions, and the plurality of image conditions may include frequently recurring events (e.g., incoming phone call, incoming text, low battery event, etc.) relating to the electronic device. In this embodiment, the image of the fixed icon may relate to the image condition (e.g., if the image condition is an incoming call, the fixed icon may depict a phone). By using display system 300 to alert the user of an image condition (instead of active display 303), large gains in power conservation may be realized.

In one embodiment, HMD 301A (specifically display system 300) includes a plurality of light sources, and the plurality of light sources form an array including rows and columns. Individual light sources in the plurality of light sources correspond to individual diffraction gratings in a plurality of diffraction gratings. When illuminated the plurality of diffraction gratings form a plurality of fixed icon images (see infra FIG. 7). Alternatively, HMD 301A may include a single light source, and the single light source is configured to selectively illuminate the individual diffraction gratings and produce images of fixed icons in the eye of the user.

Figure 3B:
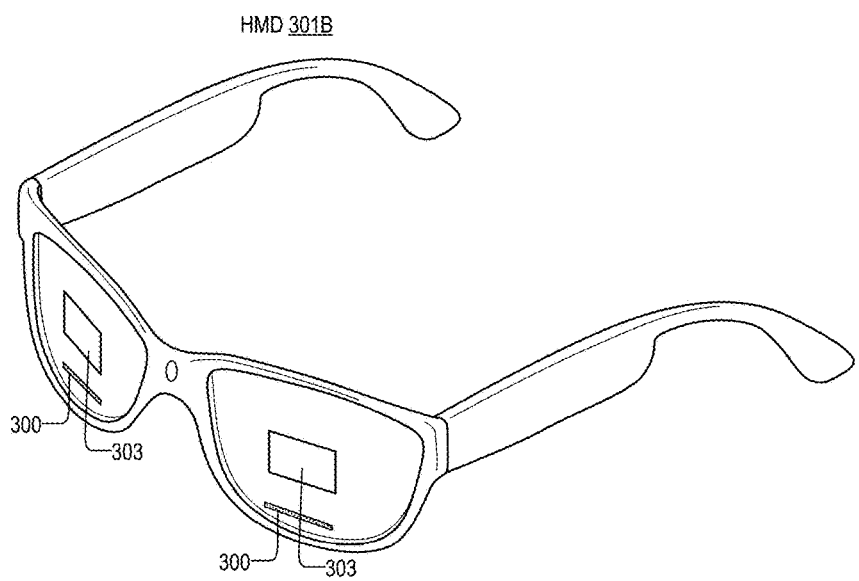

FIG. 3B is an illustration of head mounted display (HMD) 301B including the display system of FIG. 2, in accordance with an embodiment of the disclosure. FIG. 3B is similar in many respects to FIG. 3A, however, in FIG. 3B display system 300 is contained in the lens of HMD 301B. As depicted, display system 300 may be disposed in the bottom portion of the lens; however, in other embodiments not depicted, display system 300 may be disposed in other places in the lens such as the top, sides, or middle. In the depicted embodiment, display system 300 may be transparent or substantially transparent. This may be achieved by using transparent components (e.g., transparent electrodes like indium-tin-oxide, transparent organic layers, etc.) to fabricate display system 300, but may also be achieved by using very small components to fabricate display system 300.

In the depicted embodiment, the display system 300 may be disposed in the lens material. For example, the housing layers discussed in connection with FIG. 1 may be the lens material itself. Housing layers may include common lens materials such as acrylic, polycarbonate, CR-39, polyurethane, or various doped and undoped glasses (e.g., borosilicate).

Figure 4A:
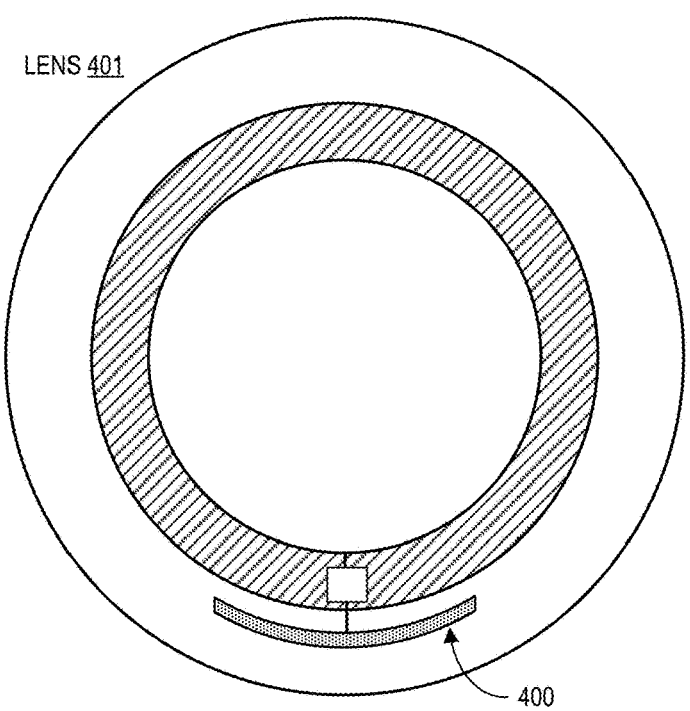
FIGS. 4A-4B are illustrations of an ocular display including the display system of FIG. 2, in accordance with an embodiment of the disclosure.
Figure 4B:
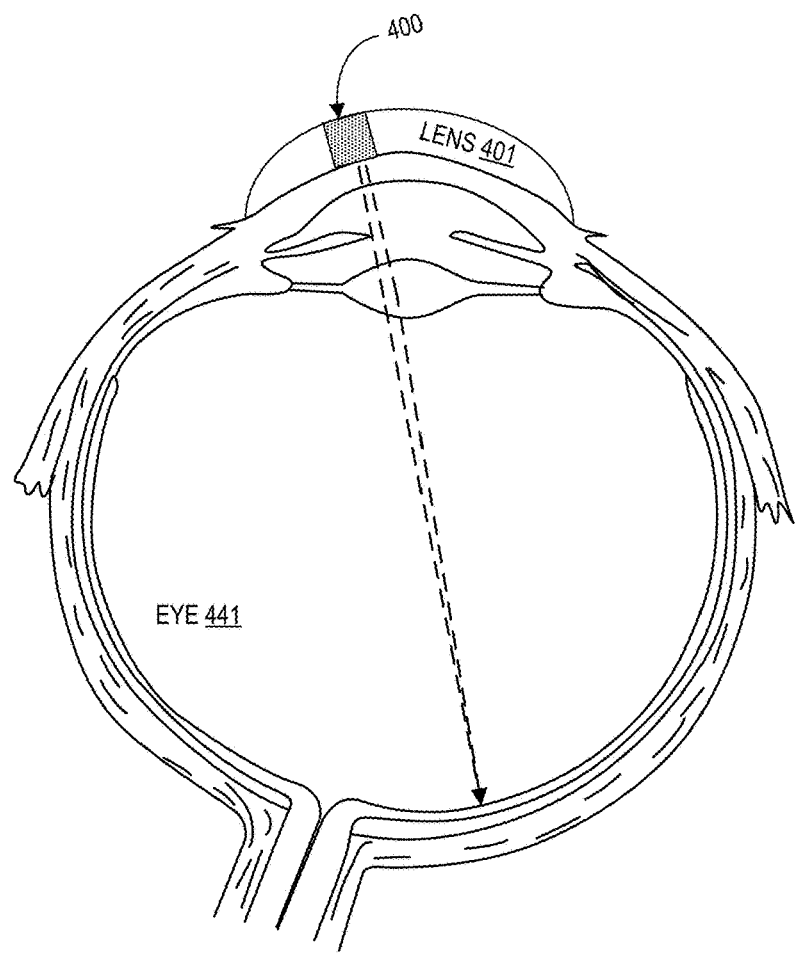

FIGS. 4A-4B are illustrations of ocular display 401 (contact lens) including the display system of FIG. 2, in accordance with an embodiment of the disclosure. Ocular display 401 should be considered one embodiment of a "head mounted display" in accordance with the teachings of the present disclosure. Ocular display 401 includes a contact lens with display system 400 disposed within it. In the depicted embodiment, display system 400 is coupled to a ring which may include an inductive charging element, battery, controller, or the like, to power and control display system 400.

In the depicted embodiment, the display system 400 may be used to present biological information to the user of ocular display 401. For example, the controller in the contact lens may detect an image condition such as low blood sugar in the user. Display system 400 may then display an image of a fixed icon to the user that says "LOW SUGAR" or "LOW BLOOD SUGAR" or a symbol that is indicative of low blood sugar (such as a red tear-drop-shaped icon).

Figure 5:
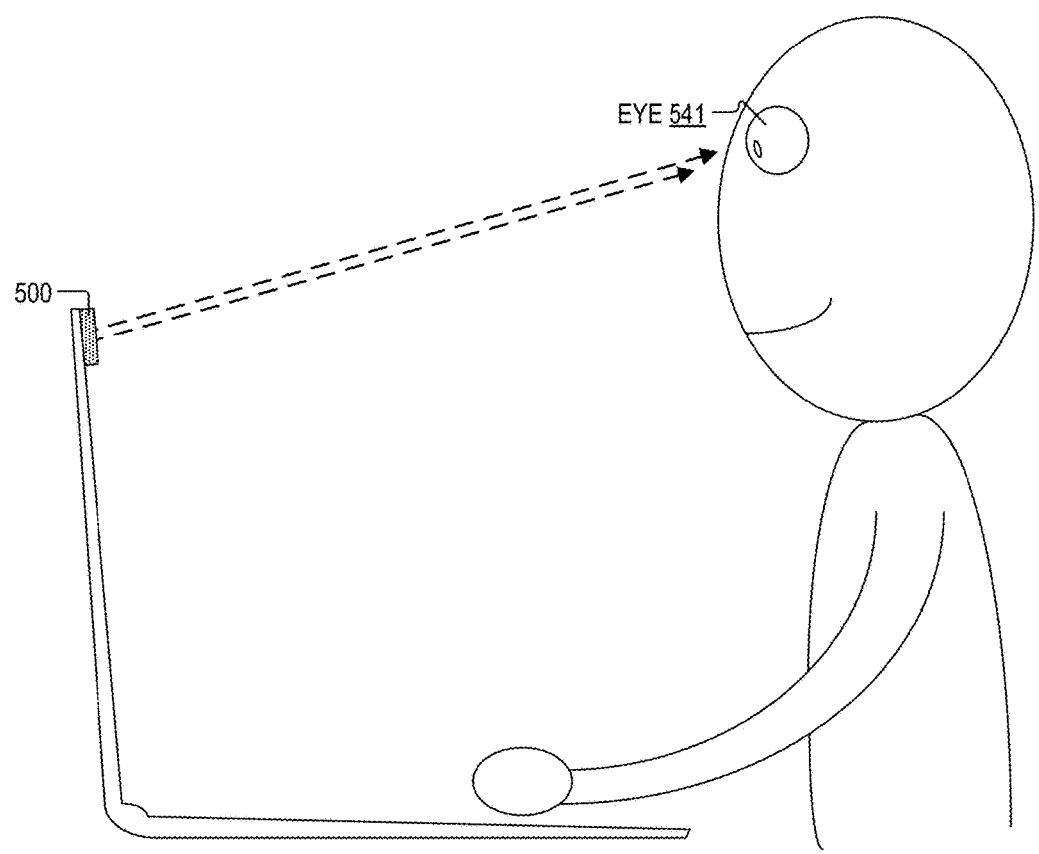
FIG. 5 is an illustration of a consumer electronic device including the display system of FIG. 2, in accordance with an embodiment of the disclosure.

FIG. 5 is an illustration of a consumer electronic device including the display system of FIG. 2, in accordance with an embodiment of the disclosure. In the depicted embodiment, display system 500 is coupled to a laptop computer. In this embodiment, the user's eye 541 is far away from the display. Accordingly, display system 500 may be coupled to an optical tracker so that light may be accurately directed into the eye 541 of the user.

Although display system 500 in FIG. 5 is coupled to a laptop, in other embodiments not shown, display system 500 may be coupled to a tablet, cellphone, smart watch, desktop computer, music player, or the like.

Figure 6:
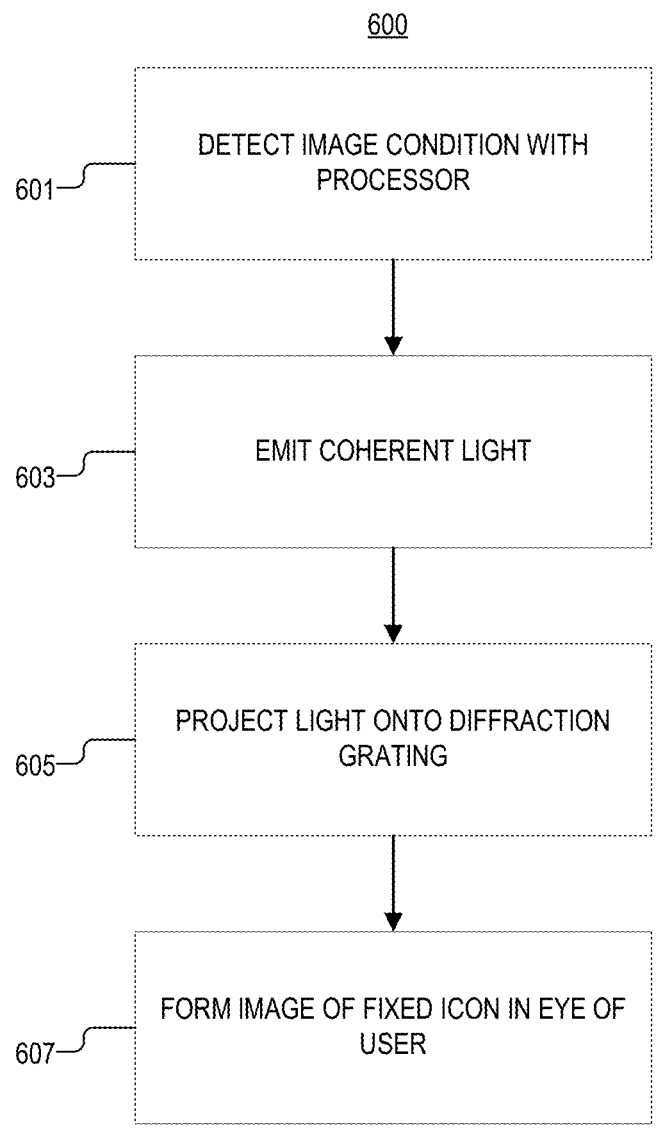
FIG. 6 is a flow chart describing a method of symbolic display, in accordance with several embodiments of the disclosure.

FIG. 6 is a flow chart describing a method of symbolic display, in accordance with several embodiments of the disclosure. The order in which some or all of process blocks 601-609 appear in process 600 should not be deemed limiting. Rather, one of ordinary skill in the art having the benefit of the present disclosure will understand that some of the process 600 may be executed in a variety of orders not illustrated, or even in parallel.

Process block 601 depicts detecting an image condition with a processor. As stated, an image condition may include frequently recurring events relating to the electronic device. For instance, if the processor and the display device are coupled to a cell phone, an image condition may include receiving a phone call.

Process block 603 shows emitting coherent light, with a light source, in response to detecting an image condition. This may involve turning on a photodiode or laser diode in a display system.

Process block 605 illustrates projecting the light onto a diffraction grating, and the diffraction grating, when illuminated with the light, produces image light of a fixed icon. This may include producing image light of one fixed icon or two or more fixed icons at the same time.

Process block 609 depicts forming, with the image light, an image of the fixed icon in an eye of a user. The image of the fixed icon may only occupy part of the user's field of view, and the image light may have a limited divergence such that the image of the fixed icon is only viewable in a single user's field of view. In one embodiment, the image light has a limited divergence such that the image of the fixed icon is only viewable in a single eye of the user.

In one embodiment, the display system may be coupled to an active display, and dynamic images may be displayed to the user at the same time as forming an image of the fixed icon.

Figure 7:
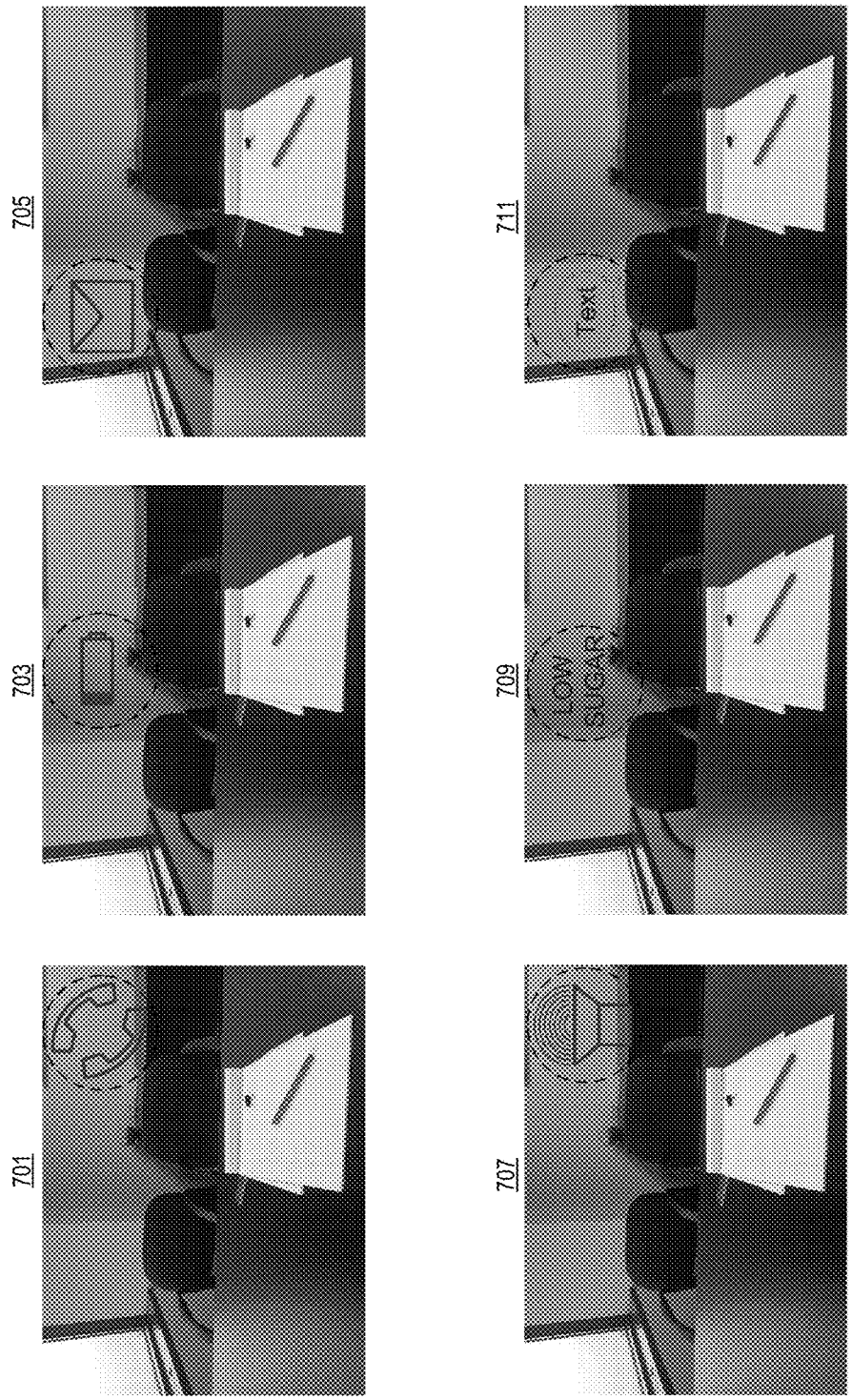
FIG. 7 is an illustration of several symbols that may be displayed, in accordance with several embodiments of the disclosure.

FIG. 7 is an illustration of several symbols that may be displayed, in accordance with several embodiments of the disclosure. Image 701 shows a fixed icon of two phones which may be displayed in response to an image condition of a phone ringing. Image 703 shows a low power/battery icon which may be in response to an image condition of a low battery in the device. Image 705 depicts email/envelope icon which may be in response to an image condition of receiving an email with the device. Image 707 depicts a volume-up speaker icon which may be in response to an image condition of loud surroundings. Image 709 depicts a "low sugar" icon which may be in response to an image condition of low blood sugar. Image 711 illustrates a text message bubble icon which may be in response to an image condition of receiving a text message. It may be appreciated that this list of examples is not exhaustive and any number of icons, or configurations of icons, may be displayed to the user, in accordance with the teachings of the present invention.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of in-eye icon projection using an electronic device comprising:
    emitting light with a light source in response to detecting an image condition;
    projecting the emitted light onto a diffraction grating, wherein the diffraction grating includes a holographic optical element that, when illuminated with the emitted light, generates image light of a fixed icon, wherein the emitted light does not include the image light of the fixed icon; and
    forming, with the image light, an image of the fixed icon in an eye of a user, wherein the image of the fixed icon occupies only part of the user's field of view, and wherein the image light has a limited divergence such that the image of the fixed icon is only viewable in a single user's field of view.

2. The method of claim 1, wherein the image light has a limited divergence such that the image of the fixed icon is only viewable in a single eye of the user.

3. The method of claim 1, wherein the diffraction grating is reflective, and wherein the image light is reflected off the diffraction grating and into the eye of the user.

4. The method of claim 1, wherein the diffraction grating is transmissive, and wherein image light is directed through the diffraction grating and into the eye of the user.

5. The method of claim 1, wherein the image condition is one of a plurality of image conditions, and wherein the plurality of image conditions include frequently recurring events relating to the electronic device, and wherein the image of the fixed icon relates to the image condition.

6. The method of claim 1, wherein the diffraction grating includes a plurality of holographic optical elements including the holographic optical element, and wherein forming an image of the fixed icon includes forming a plurality of images of a plurality of fixed icons including the image of the fixed icon.

7. The method of claim 1, further comprising displaying, with an active display separate from the light source, dynamic images to the user, wherein the dynamic images are displayed at the same time as forming an image of the fixed icon.

8. A head mounted display (HMD) comprising:
    a light source configured to emit light, wherein the emitted light is coherent and does not include image light of a fixed icon;
    a diffraction grating having a holographic optical element that, when illuminated with the emitted light, generates image light of the fixed icon, and wherein the diffraction grating is optically aligned with the light source; and
    a controller communicatively coupled to the HMD, the controller including logic instructions that, when executed by the controller, will cause the HMD to perform operations comprising:
    detecting an image condition; and
    turning on the light source, in response to the image condition, to project the emitted light onto the diffraction grating, wherein the diffraction grating produces the image light of the fixed icon, and wherein the image light of the fixed icon is directed into an eye of a user, wherein the image light produces an image of the fixed icon in the eye of the user, and wherein the image light has a limited divergence such that the image of the fixed icon is only viewable in the user's eyebox.

9. The HMD of claim 8, wherein the diffraction grating is reflective, and wherein the image light is reflected off the diffraction grating and into the eye of the user.

10. The HMD of claim 8, wherein the diffraction grating is transmissive, and wherein the image light is directed through the diffraction grating and into the eye of the user.

11. The HMD of claim 8, wherein the light source includes a light emitting diode, and wherein an opaque layer is disposed between the light emitting diode and the diffraction grating, wherein the opaque layer includes an aperture optically aligned with the light emitting diode to emit coherent light.

12. The HMD of claim 8, wherein the light source includes a laser diode.

13. The HMD of claim 8, further comprising:
a plurality of light sources including the light source, wherein the plurality of light sources form an array including rows and columns; and
a plurality of diffraction gratings including the diffraction grating, wherein individual light sources in the plurality of light sources correspond to individual diffraction gratings in the plurality of diffraction gratings, and wherein when illuminated the plurality of diffraction gratings form a plurality of fixed icon images.

14. The HMD of claim 8, further comprising an active display communicatively coupled to the controller and separate from the light source, wherein the controller further includes instructions that, when executed by the controller, cause the active display to display changing images to the user.

15. The HMD of claim 8, wherein the diffraction grating generates a plurality of offset instances of the fixed icon to create a larger eyebox in which the user's eye can see the fixed icon images.

16. A head mounted display (HMD) comprising:
a light source configured to emit light, wherein the light is coherent;
a plurality of diffraction gratings, wherein individual diffraction gratings in the plurality of diffraction gratings correspond to a plurality of images of fixed icons, and wherein the light source is configured to selectively illuminate the individual diffraction gratings and produce images of the fixed icons in an eye of a user; and
a controller communicatively coupled to the HMD, the controller including instructions that, when executed by the controller, cause the HMD to perform operations comprising:
detecting an image condition; and
activating the light source, in response to the image condition, to project light onto a selected diffraction grating, wherein the selected diffraction grating produces image light of a fixed icon, and wherein the image light of the fixed icon is directed into an eye of a user, wherein the image light produces an image of the fixed icon in the eye of the user, and wherein the image light has a limited divergence such that the image of the fixed icon is only viewable in the user's eyebox.

17. A display system, comprising:
a light source configured to emit coherent light;
a plurality of diffraction gratings arranged into an array, wherein the diffraction gratings are optically aligned with the light source, and wherein each diffraction grating includes a different holographic optical element that, in response to being selectively illuminated by the coherent light, produces image light of a corresponding different fixed icon; and
a controller coupled to the display system, the controller including instructions that, when executed by the controller, cause the display system to perform operations comprising:
turning on the light source, in response to an image condition, to project image light into an eye of a user of the display system, wherein the image light forms an image of one or more of the fixed icons in the eye of the user.

18. The display system of claim 17, further comprising an active display coupled to the controller and separate from the light source, wherein the controller further includes instructions that, when executed by the controller, cause the active display to display changing images to the user.

19. The display system of claim 17, wherein the light source includes a plurality of diodes, and wherein each diode corresponds to an individual diffraction grating in the plurality of diffraction gratings.

20. The display system of claim 17, wherein the image light has a narrow divergence such that the image of the one or more fixed icons is only viewable in a single user's field of view.

* * * * *